United States Patent [19]
Binzer et al.

[11] Patent Number: 5,219,469
[45] Date of Patent: Jun. 15, 1993

[54] FILTER MEDIUM HAVING FLOCK ISLANDS OF FIBERS ANCHORED BY CALOTTE SHAPED ADHESIVE DEPOSITS

[75] Inventors: Jürgen C. Binzer; Kurt Plohnke; Günter Jeide, all of Hatzfeld, Fed. Rep. of Germany

[73] Assignee: J.C. Binzer Papierfabrik GMBH & Co., Hatzfeld, Fed. Rep. of Germany

[21] Appl. No.: 791,253

[22] Filed: Nov. 13, 1991

[30] Foreign Application Priority Data

Aug. 21, 1991 [EP] European Pat. Off. ........ 91113963.2

[51] Int. Cl.<sup>5</sup> ..................... B01D 29/00; B01D 39/04
[52] U.S. Cl. ........................... 210/483; 55/477; 55/514; 55/528; 210/508; 428/90
[58] Field of Search ............ 210/483, 490, 491, 505, 210/508; 55/477, 527-529, 514; 428/90, 288

[56] References Cited

U.S. PATENT DOCUMENTS

| | | |
|---|---|---|
| 741,210 | 10/1903 | Young .................................. 55/477 |
| 2,369,857 | 2/1945 | Russell et al. ...................... 210/505 |
| 2,945,557 | 7/1960 | Powers ................................ 55/514 |
| 3,219,194 | 11/1965 | Schwartzwalder et al. ....... 210/505 |
| 3,575,764 | 4/1971 | McFarren ........................... 428/288 |
| 4,610,905 | 9/1986 | Von Blucher et al. ............. 428/90 |
| 5,002,814 | 3/1991 | Knack et al. ....................... 210/505 |
| 5,006,399 | 4/1991 | Salminen et al. .................. 428/90 |

FOREIGN PATENT DOCUMENTS 2806688 8/1978 Fed. Rep. of Germany ...... 210/508

Primary Examiner—Joseph W. Drodge
Attorney, Agent, or Firm—Lowe, Price, LeBlanc & Becker

[57] ABSTRACT

A unitary filter medium that is composed of a sheet of porous substrate that has bonded to its upstream surface a plurality of separate spaced apart islands of flock fibers, the fibers of adjacent islands at least partially overlapping. The flock fibers are bonded by calotte shaped adhesive structures to the substrate so as to form porcupine-like arrays.

15 Claims, 3 Drawing Sheets

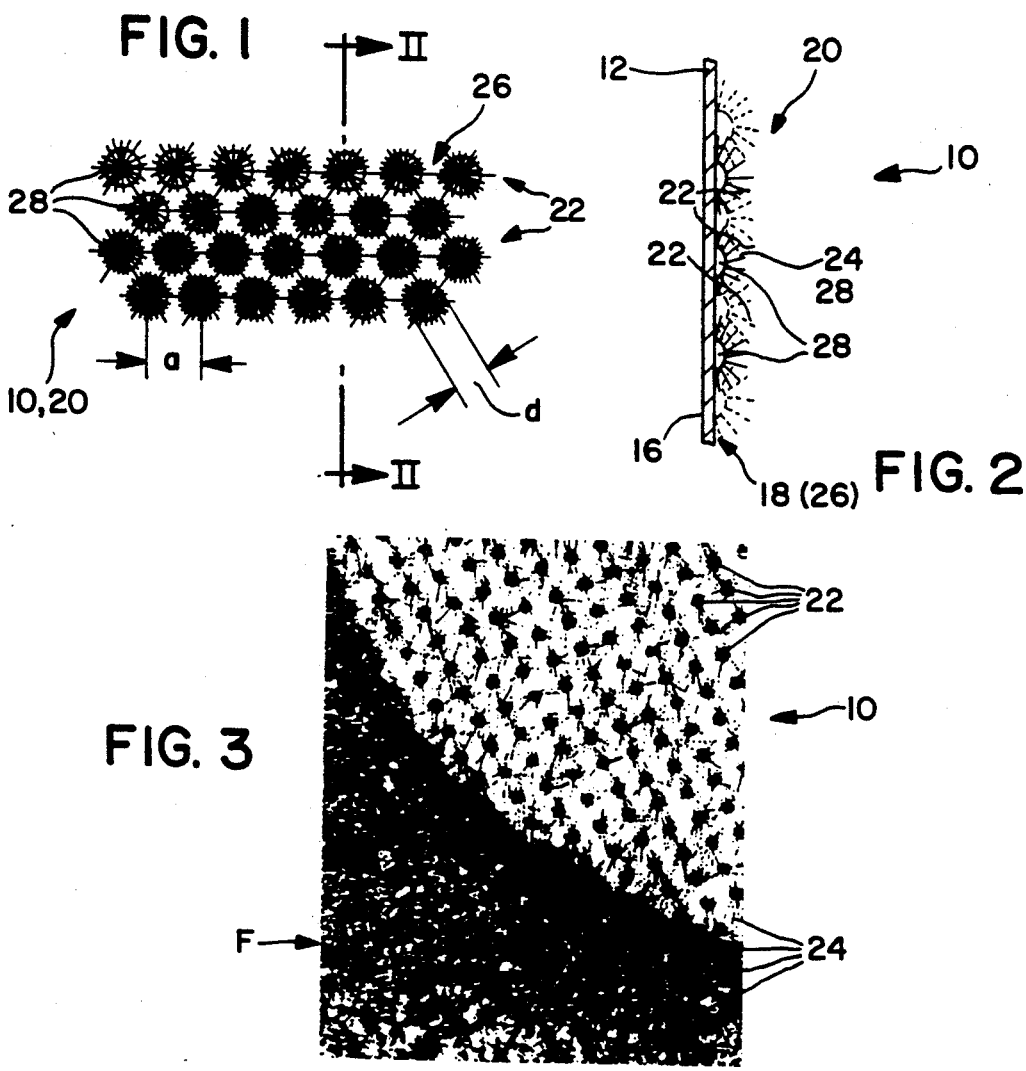
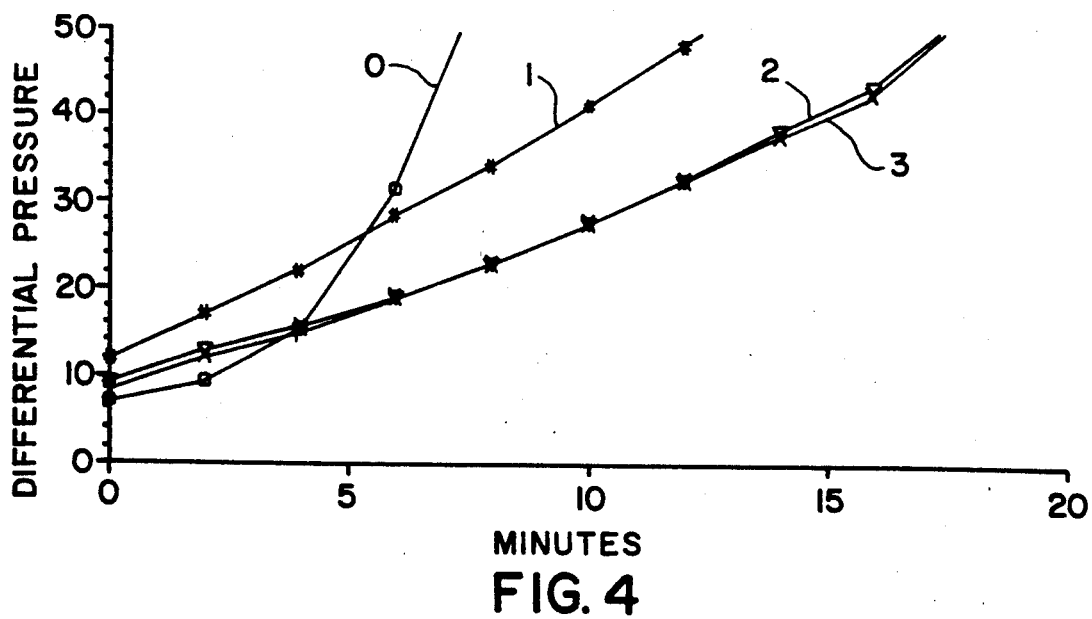

FILTER MEDIUM HAVING FLOCK ISLANDS OF FIBERS ANCHORED BY CALOTTE SHAPED ADHESIVE DEPOSITS

FIELD OF THE INVENTION AND PRIOR ART

The invention relates to a new filter medium.

Filter media are used to filter fluids, i.e. gasses and liquids. Known filters sometimes have a narrowly restricted capacity to retain impurities. As a polluted fluid passes through a filter, its separating capacity will govern the storing of particles on the surface and/or within the interior of the filter. Its flow resistance will grow as the impurities accumulate until a limit is reached and the filter must be cleaned or exchanged.

The period of time passing until said limit is reached or exceeded, i.e. the service time, will depend on a number of parameters such as nature and concentration of particles, filter area and geometry as well as flow velocity, and in particular on the specific storage capacity of the filter medium. In case of dust this is defined as the quantity per unit area of a certain test dust that will be retained by the filter medium until a differential pressure limit is reached. Quite often a conventional filter medium is likely to get clogged at a fast rate so that the required maintenance work must be performed at rather short intervals, resulting in considerable expenditures.

OBJECTS OF THE INVENTION

It is an important object of the invention to effect improved filtration using as simple and economical means as possible.

The invention also aims at creating filter media of such design that their separating capacity is considerably increased over that of conventional filters.

Another object of the invention consists in providing such a design that the novel filter media according to the invention can manufactured with reproducibly favorable properties in a cost-saving fashion.

PRINCIPLE OF THE INVENTION

In a filter medium having a flock-coated porous support of given shape, the invention as described hereinafter provides that the support is a porous substrate of given separating capacity and forms a main filter whose flow-exposed side is preceded by the flock whereby the latter acts as a prefilter.

This novel design warrants a minimum of expenditure for an extremely efficient filter medium that is suitable for most variegated utilization with both gaseous and liquid or flowable matter. Early clogging is prevented by the prefiltering flock so that long service periods are obtained. In addition, any maintenance work required is greatly facilitated by the flock structure.

SPECIALIZATIONS OF THE INVENTION

Advantageously, the support is coated according to one embodiment with an array of flock islands such that the fibres of neighboring flock islands still overlap but that between the latter, there are support surfaces bearing little or no flock. In spite of much greater specific storage capacity, the flow resistance as compared to flock-free media has proved not to change significantly thereby.

Surprisingly it was found that a filter medium of this type is suited to receive several times as much dirt, e.g. dust from air or other gasses, as flock-free filter media of otherwise similar sort with the same differential pressure limit. Flock-coated filter media per se have been known, it is true, e.g. from EP-A2-0 136 605 where it is disclosed to electrostatically coat a support with carbon fibres. These are quite short and are uniformly attached, in a vertical direction, to an adhesive support area. The fibre top ends are particularly provided with a cover coating so as to prevent fibre abrasion. Obviously such a medium is hardly suited for filtering purposes; in fact, it is applied in the field of protective clothing.

The invention distinguishes very favorably over this prior art by its novel array of flock islands which warrant high fluid permeability as well as excellent two-stage filtering with long service periods. Since flow exposure is on the flock side, the filter cake is continuously broken up during operation, thereby much enhancing the versatility of applications. The novel filter media are advantageously used for gas filtration, e.g. as air filters and as driver's cab filter in the field of automotive technology, for strainable dedusting filters and for vacuum cleaner inserts, too.

In accordance with another embodiment, the support is of filtering paper, filtering fleece or tissue. This is beneficial in that a wide range of such supports is commercially available; therefore, different filter units can be manufactured easily and most economically.

It is possible to control the specific storage capacity by the choice of flocking parameters. Depending on the type of array, on the size and number of grid dots or flock islands and also on the fibre dimensions, different particle retention is obtained. Important parameter ranges including preferred dimensioning are in other embodiments. Let a be the distance between flock island centers, l the free length of the fibres and d the diameter of the core area substantially occupied by the adhesive grid dots, the following relation give in one embodiment will hold:

$$a \leq d + 2l.$$

Above all thin fibres of greater lengths are expedient, although technological difficulties tend to hamper flocking with long fibres. If the fibre length much exceeds half the mean center distance between the flock islands, the overlap thus created will impede the particle retention in a measurable degree.

Independent protection is sought for the feature according to which the flock islands include a convex adhesive area from which the fibres extend whereby they form a porcupine-like barbed structure in a solid angle distribution. This is an important distinction over the conventional flocking methods as disclosed, e.g. EP-A2-0 136 605 or in EP-B1-0 139 901, where the flock fibres are always vertically shot into a plane support by electrostatic force. In another special embodiment, the convex adhesive area is shaped like a calotte shell from which the fibres anchored therein project substantially in radial directions. Therefore, an overlap will occur only with some fibres at island borders, whereas other fibres are pointed upwards and outwards in various directions, much in the way of a bulging brush.

A further embodiment further provides that the array of flock islands is formed by intersecting families of uniformly spaced lines, in particular by parallel lines intersecting each other at right or acute angles. Realization of such geometry is technically easy and leads to a highly effective filter medium.

Moreover, it is propitious if, in accordance with another embodiment, the flock fibres consist of flexible material, e.g. of viscose staple hair or of plastics such as polyamide, polypropylene or polyethyleneterephthalate. This results not only in a certain elasticity of the coating, but also in facilitating the cleaning operation of the filter medium because, as the fibres yield and rise again, they promote the loosening and shaking off of the filter cake.

Further specializations, embodiments, modifications, details and advantages of the invention will become evident from the

Annexed Drawings wherein:

FIG. 1 is a schematic enlarged partial view of a flock island array,

FIG. 2 is a sectional view of a filter medium corresponding to the sectional plane II—II in FIG. 1, FIG. 3 is an enlarged top view of a filter medium, FIGS. 4 to 7 show one time diagram each of the differential pressure of various filter media when loaded with uniform test dust and FIG. 8 is a partial sectional view of a bellows-type filter.

Figure 5:
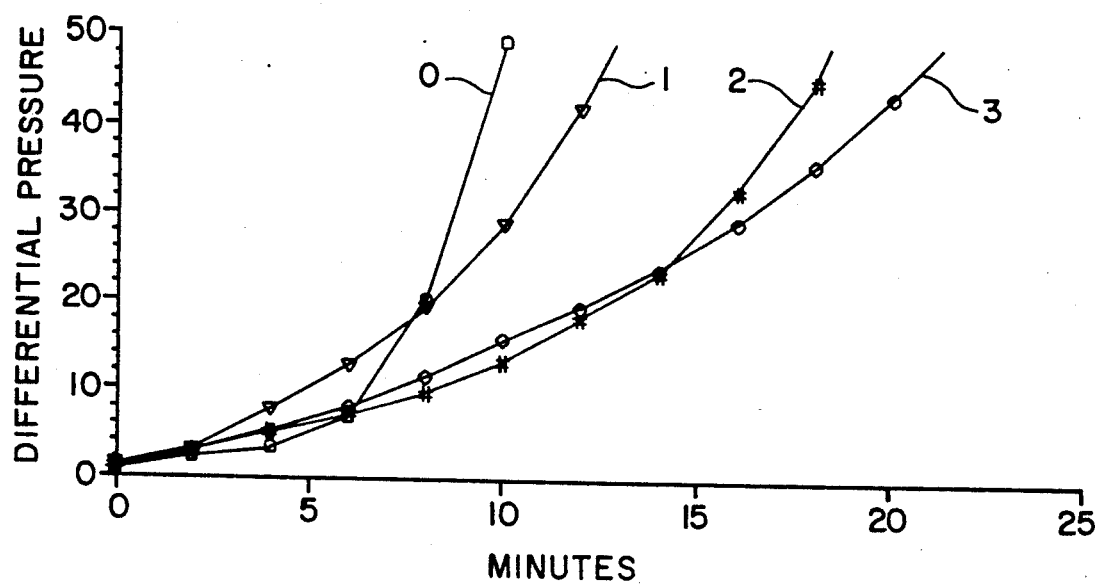

As seen in FIG. 1, a filter medium 10 supports on one side a flock 20 forming flock islands 22 the actual shape of which may deviate from the circles drawn; triangles, quadrangles such as squares and lozenges, polygonal structures, etc. may likewise be used.

In accordance with FIG. 2, the flock 20 is applied on a support 12 which may be of porous filtering paper, filtering fleece or tissue. Generally the flock islands 22 comprise adhesive areas 28 coated with fibres 24 which form porcupine-like barbed structures. The fibres 24 extend in substantially radial directions from the surface of each adhesive area 28 so as to form a solid angle distribution. The adhesive areas 28 are convex, e.g. by way of calotte shells, and are preferably made by application of heat-resistant dispersion binders such as acrylate adhesives.

Owing to a relatively dense grid arrangement of the flock islands 22, the free ends of neighboring fibres 24 partly overlap whereas in between or underneath, there are adhesive-free support areas 26. The grid shown in FIG. 1 with three families of parallels intersecting each other under angles of 60 degrees each is different from the array of FIG. 3 where two families of parallels intersect each other under right angles to form the grid dots or flock islands 22. FIG. 3 further shows part of a filter cake F with fibres 24 penetrating singly or in bunches so that their flexibility provides for continuous flow through the filter.

In addition to the type of array and its size, the fibres 24 of the flock 20 are most important for the specific storage capacity of the filter medium 10. The distance a between the centers of the flock islands 22 is preferably in the range of 0.8 mm to 5.5 mm; the mean diameter of each flock island's core area is about 0.3 mm to 2.5 mm and more particularly between 1.5 mm and 2.0 mm. Expediently, the center distance a between the flock islands 22 equals the mean core area diameter multiplied by a factor of approximately 1.5. Flock fibre sizes ranging between 0.5 dtex and 10 dtex as well as flock fibre lengths l in the range from 0.3 mm to 3.0 mm have proved to be highly advantageous; again, fibre deniers between 1 dtex and 7 dtex as well as fibres lengths between 0.5 mm and 1.5 mm are preferred for very satisfactory filtering.

The influence of the fibre sort used for flocking on the service time of the filter medium 10 will become evident from FIG. 4 wherein diagram 0 shows flock-free filtering paper. Already when flocked with polyethyleneterephthalate (diagram 1), the service time is clearly longer. Flocking with polyamide fibres (diagram 2) and with viscose staple hair (diagram 3) leads to further extension of service time under equal dust concentration. Uniform fibre deniers of 3.3 dtex and uniform fibre lengths of 0.5 mm were used for flocking in these tests. The test dust employed is commonly designated by AC fine and features a grain size distribution that is roughly uniform below 80 $\mu$m, on a logarithmic scale, with a portion of almost 40 percent ranging below 5 $\mu$m.

FIG. 5 displays the influence of the fibre length l. Flock-free filtering paper (diagram 0) is compared to flocked air-filtering paper that is provided, on the strainer side (16 in FIG. 2), with polyamide fibres of the uniform denier of 3.3 dtex in various lengths, viz. 0.75 mm (diagram 1); 1.0 mm (diagram 2); and 1.4 mm (diagram 3). It will be noted that greater fibre lengths tend to considerably increase the service time, albeit to a limit range where extended overlaps of still longer fibres will impede the accumulation of dirt.

Figure 6:
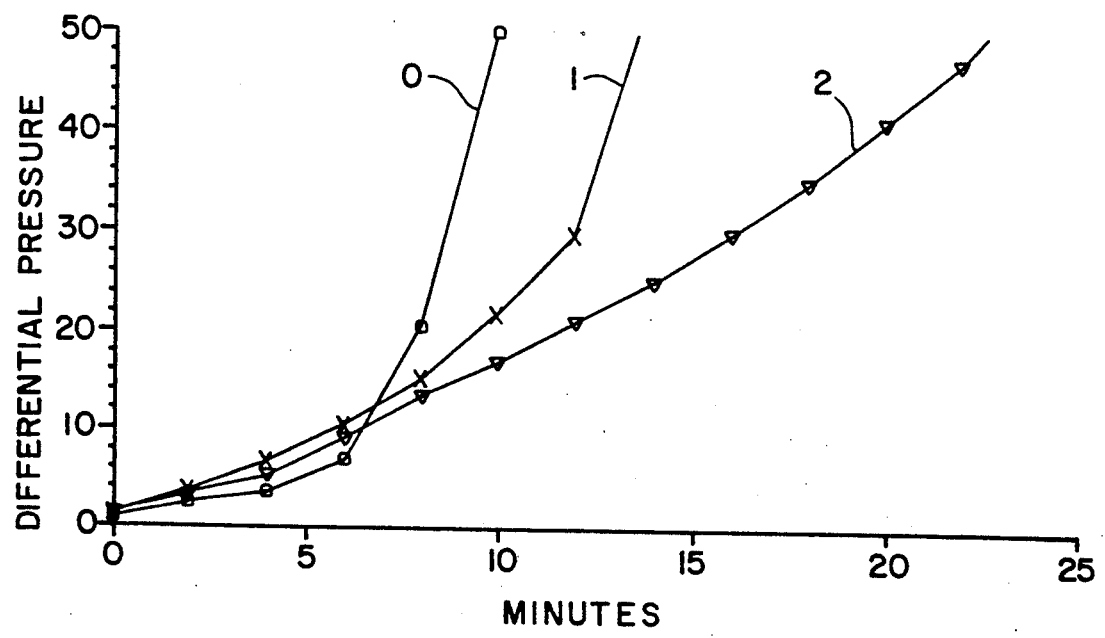

When flocked with thicker polyamide fibres of 6.7 dtex, the same air-filtering paper will bring comparable results (FIG. 6). Here a fibre length of 1.5 mm (diagram 2) leads to much better service time than a fibre length of 1.0 mm (diagram 1).

Figure 7:
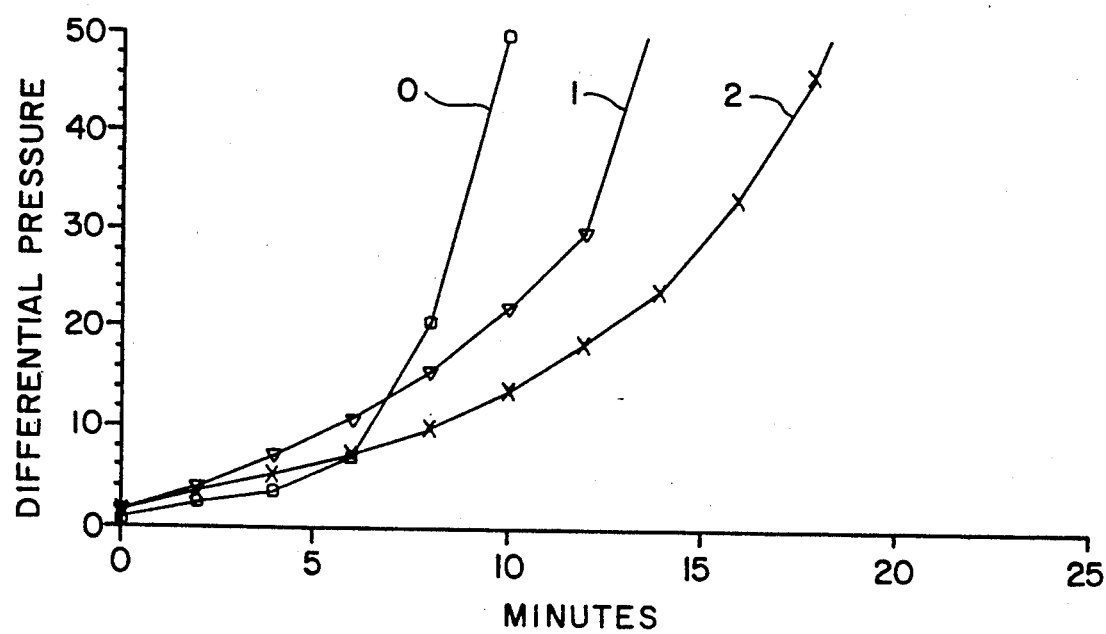

FIG. 7 shows how the service time of the filter medium 10 is influenced by the fibre denier. The strainer side 16 was flocked with polyamide fibres of 1.0 mm length and of 6.7 dtex denier (diagram 1) or 3.3 dtex denier (diagram 2), respectively. It will be seen the filter medium 10 having thinner fibres 24 is far more effective.

Figure 8:
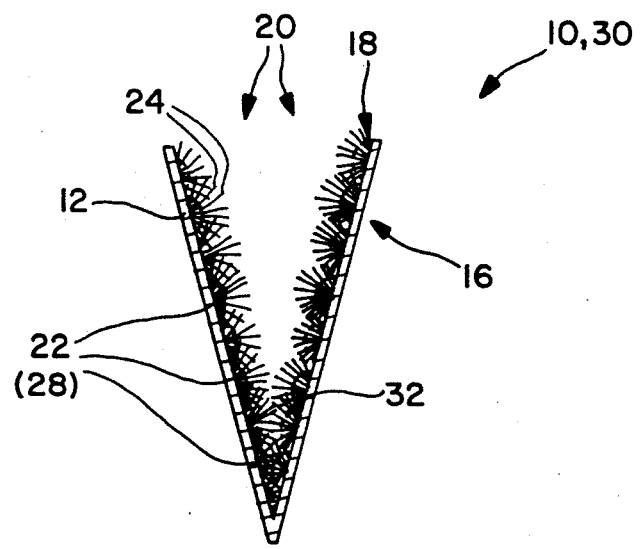

Indeed, important advantages of the invention are rooted in the effect of thin fibres 24 being spatially distributed in a regular array of grid dots such that free fibres ends of neighboring flock islands 22 will partly overlap. Depending on the nature of the support 12 used, further effects may result. In the example of FIG. 8, the support 12 is shaped to form expansion bellows 30 so that the flock 20 will tend to loosen the filter cake in each groove 32 by way of deviating the flow to be filtered in a roughly tangential direction towards the fold interior. This will avoid any fast or extensive clogging of the interior, such as rather frequently happens with conventional filter media. By contrast, the invention causes sort of flushing in a longitudinal direction in addition to loosening the filter cake by the swinging fibres 24 so that any excessive back-up of dirt in the grooves 32 is effectively prevented.

The invention is not restricted to the specific examples disclosed. It is in particular also applicable to conventional filter elements by flocking them subsequently according to the invention. Flocking arrays or grid arrangements as well as the flock fibres to be used can further be matched and employed in most variegated combinations.

Therefore, while preferred embodiments have been illustrated and explained hereinabove, it should be understood that numerous variations and modifications may be apparent to one skilled in the art without departing from the fundamental invention which thus is not to be construed as being limited to the special types described.

We claim:

1. A unitary filter medium (10), having an upstream side and a downstream side, the filter medium comprising
    (a) a support surface that is in the form of a porous substrate having an upstream side (12) that can separate solid particles from a fluid,
    (b) a plurality of separate flock islands (22) of flock fibers (24) bonded by convex adhesive deposits to the upstream side of said porous substrate (12) in a spaced apart pattern, each of said flock islands (22) comprising a plurality of flock fibers (24) which extend outwardly so as to form a porcupine-like barbed array of fibers and so that there is at least some overlap of the flock fibers (24) of adjacent flock islands (22), the areas of said porous substrate (12) between said flock islands (22) being free of flock fibers (24) bonded thereto, and
    (c) wherein each said convex deposit of adhesive (28) is shaped like a calotte shell from which the fibers (24) anchored therein project in substantially radial directions.

2. A filter medium according to claim 1 wherein said substrate (12) is filter paper, filtering fleece or tissue.

3. A filter medium according to claim 1 wherein said flock islands (22) are spaced by center distances (a) ranging from 0.8 mm to 5.5 mm.

4. A filter medium according to claim 1 wherein each said flock island (22) has a core area whose average diameter is within the range of 0.1 mm to 8 mm.

5. A filter medium according to claim 4 wherein the average core diameter ranges between 0.3 mm and 2.5 mm.

6. A filter medium according to claim 1 wherein the fiber sizes range from 0.5 dtex to 10 dtex.

7. A filter medium according to claim 1 wherein the fiber lengths range from 0.3 mm to 3.0 mm.

8. A filter medium according to claim 1 wherein the flock islands (22) are spaced by center distances (a) which are approximately equal to sums of respective island diameters and twice the lengths of fibers of the respective islands.

9. A filter medium according to claim 8, wherein the center distances equal products of the respective island diameters (d) multiplied by a factor of 1.2 to 2.

10. A filter medium according to claim 8 wherein the center distances equal product of the respective island diameters (d) multiplied by a factor of 1.5

11. A filter medium according to claim 1 wherein the pattern of the flock islands (22) is formed by intersecting families of uniformly spaced lines.

12. A filter medium according to claim 1 wherein the array is formed along parallel lines intersecting each other at right or acute angles.

13. A filter medium according to claim 1 wherein the flock fibers (24) consist of viscose staple hair or flexible plastics material, comprising polyamide, polypropylene and polyethyleneterephthalate.

14. A filter medium according to claim 1 wherein the fiber sizes range from 2 dtex to 7 dtex.

15. A filter medium according to claim 1 wherein the fiber lengths range from 0.5 mm to 1.5 mm.

* * * * *